N. THOMPSON.
Improvement in the Construction of Stench-Traps.
No. 128,263.                              Patented June 25, 1872.
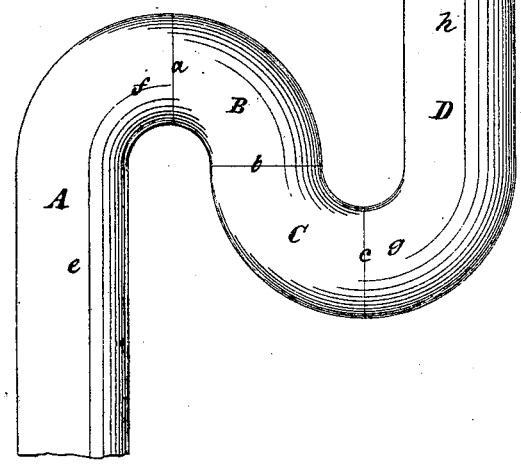
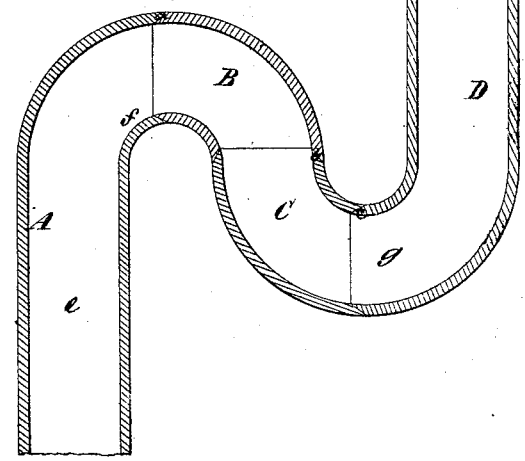
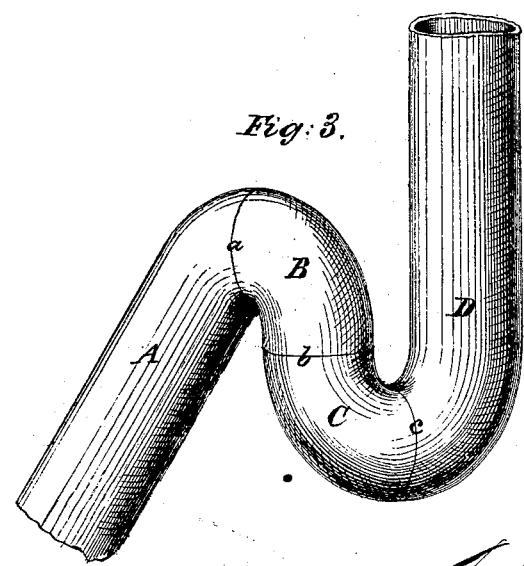

UNITED STATES PATENT OFFICE.

NATHAN THOMPSON, OF BROOKLYN, NEW YORK.

IMPROVEMENT IN THE CONSTRUCTION OF STENCH-TRAPS.

Specification forming part of Letters Patent No. 128,263, dated June 25, 1872; antedated June 8, 1872.

*To all whom it may concern:*

Be it known that I, NATHAN THOMPSON, of Brooklyn, in the county of Kings and State of New York, have invented a new and useful Improvement in Stench-Traps; and I do hereby declare that the following is a full, clear, and exact description of the same, reference being had to the accompanying drawing forming part of this specification, and in which—

Figure 1 represents a side elevation of a trap constructed in accordance with my improvements, and Fig. 2 a vertical section of the same taken through the center in a plane parallel with the side of the trap. Fig. 3 is a view in perspective of a similarly-constructed trap, but with the sections of which it is composed twisted at their joints so as to throw said sections out of a straight course with one another, in illustration of one of the advantages which may be attained by any improved construction of the trap.

Similar letters of reference indicate corresponding parts throughout the drawing.

This invention relates to stench-traps made of lead or other soft-metal pipe, formed in sections, and capable of being united by soldering, such as used by plumbers and others for sinks, water-closets, and other purposes.

Much difficulty has heretofore been experienced in making these traps, and, when in two parts or sections, forming a seam longitudinally through the center of the trap, there is a large exposure of joint-surface to make and keep tight; also, such construction affords imperfect facility for varying the configuration of the trap or certain portions of it to adapt it to different chambers or spaces, or to connect it with different courses of extension pipe. This latter remark applies with equal pertinency to traps made of a single piece, in the construction of which, also, there is great difficulty.

My invention consists in a trap made of lead or other like pipe in entire or closed sections peripherically with its joints, which unite the sections, arranged transversely to the pipe in the bent portions of the trap, and formed by the sections fitting at their ends the one within the other, and afterward uniting them by soldering.

A trap thus constructed is at once strong, easily put together, presents a limited joint exposure, and admits of being variously twisted or shaped when putting the sections together to adapt it to different places or connections.

In the accompanying drawing, A, B, C, and D represent a trap constructed in accordance with my improvement, the same being composed of curved or partly curved pieces or sections of lead pipe, which may be cast in molds provided with curved or combined curved and straight cores, as described in an application for patent filed simultaneously with this on an improvement in apparatus for making curved or partly-curved pipe. Each section, A, B, C, or D, is an entire or closed section of pipe circumferentially, and has its end or ends made beveling externally or internally, as at $b$, to provide for the fit of the adjacent sections at their ends, the one within the other, after which they are united by soldering at the joints $a$, $b$, and $c$, thus formed. The one pipe section A is made of a straight portion, $e$, and a curved portion, $f$. The pipe sections B and C are mainly or wholly curved; and the pipe section D is composed of a curved portion, $g$, and straight portion, $h$. Thus the joints $a$, $b$, $c$, and $d$ are arranged transversely of the trap in the bent portions of it.

By this arrangement of the joints and fit of the pipe sections together the several parts of the trap are easily fitted together; the joints are limited in extent and easily soldered; and the several pipe sections, or any of them may be variously twisted or turned, one within the other, at their ends, before soldering the joints, to adapt the trap to cramped places or to connect it with variously-disposed inlet or outlet pipes or orifices.

Figs. 1 and 2 show a trap in which the several pipe sections lie in a like vertical course; and Fig. 3 a trap in which said sections, or certain of them, are twisted to occupy different courses.

What is here claimed, and desired to be secured by Letters Patent, is—

A stench-trap composed of a series of curved or partly-curved pipe sections, made to fit the one within the other at their ends, and afterward soldered, forming joints transversely of the trap within the bent portion of it, substantially as specified.

NATHAN THOMPSON.

Witnesses:
FRED. HAYNES,
R. E. RABEAU.